(12) United States Patent
Thorning

(10) Patent No.: US 7,357,726 B2
(45) Date of Patent: Apr. 15, 2008

(54) METHOD OF PRODUCING A FIBRE REINFORCED STRUCTURAL ELEMENT

(75) Inventor: Henrik Thorning, Kolding (DK)

(73) Assignee: Fiberline A/S, Kolding (DK)

(*) Notice: Subject to any disclaimer, the term of this patent is extended or adjusted under 35 U.S.C. 154(b) by 350 days.

(21) Appl. No.: 10/501,285

(22) PCT Filed: Jan. 9, 2003

(86) PCT No.: PCT/DK03/00010

§ 371 (c)(1),
(2), (4) Date: Jan. 14, 2005

(87) PCT Pub. No.: WO03/057456

PCT Pub. Date: Jul. 17, 2003

(65) Prior Publication Data

US 2005/0123374 A1 Jun. 9, 2005

(30) Foreign Application Priority Data

Jan. 11, 2002 (EP) .................................. 02388002

(51) Int. Cl.
*B21H 3/02* (2006.01)
(52) U.S. Cl. .......................................... 470/16; 470/14
(58) Field of Classification Search ................ 470/11, 470/12, 14, 16, 2, 3, 5, 6, 57; 264/136, 137; 156/166, 167, 242, 245; 416/230; 411/82.2
See application file for complete search history.

(56) References Cited

U.S. PATENT DOCUMENTS

| | | | | |
|---|---|---|---|---|
| 4,307,979 A | * | 12/1981 | Killmeyer | 405/259.1 |
| 4,863,330 A | * | 9/1989 | Olez et al. | 411/424 |
| 5,156,787 A | * | 10/1992 | Booher | 264/135 |
| 5,421,931 A | * | 6/1995 | Carmien | 156/172 |
| 5,567,374 A | * | 10/1996 | Thicthener et al. | 264/137 |
| 6,106,944 A | * | 8/2000 | Heikkila et al. | 428/397 |
| 6,324,940 B1 | * | 12/2001 | Pazdirek et al. | 74/579 R |
| 6,493,914 B2 | * | 12/2002 | Kaiser et al. | 29/33 Q |
| 7,163,378 B2 | * | 1/2007 | Kildegaard | 416/230 |

FOREIGN PATENT DOCUMENTS

DE 196 25 426 A 1/1998
GB 2 119 472 A 11/1983

* cited by examiner

*Primary Examiner*—Ed Tolan
(74) *Attorney, Agent, or Firm*—Klein, O'Neill & Singh, LLP; Howard J. Klein

(57) ABSTRACT

A method of producing a fibre reinforced structural element including a plurality of fittings for the fixation of the element to another structural element, includes the steps of: (i) providing a core element of fibre reinforcement material having an end part; (ii) mounting a fitting on the end part to produce a subassembly; (iii) fixating the fitting to the end part in a pultrusion process that includes covering the subassembly in fibre-reinforced resin that is then cured; (iv) machining the subassembly to provide a fitting assembly including the core element and the fitting; (v) repeating steps i-iv for producing a plurality of fitting assemblies; (vi) positioning the plurality of assemblies according to the position of the plurality of fittings; and (vii) producing the structural element including the plurality of fittings constituted by the plurality of assemblies in an extrusion, pultrusion, or fibre reinforcing production technique.

16 Claims, 8 Drawing Sheets

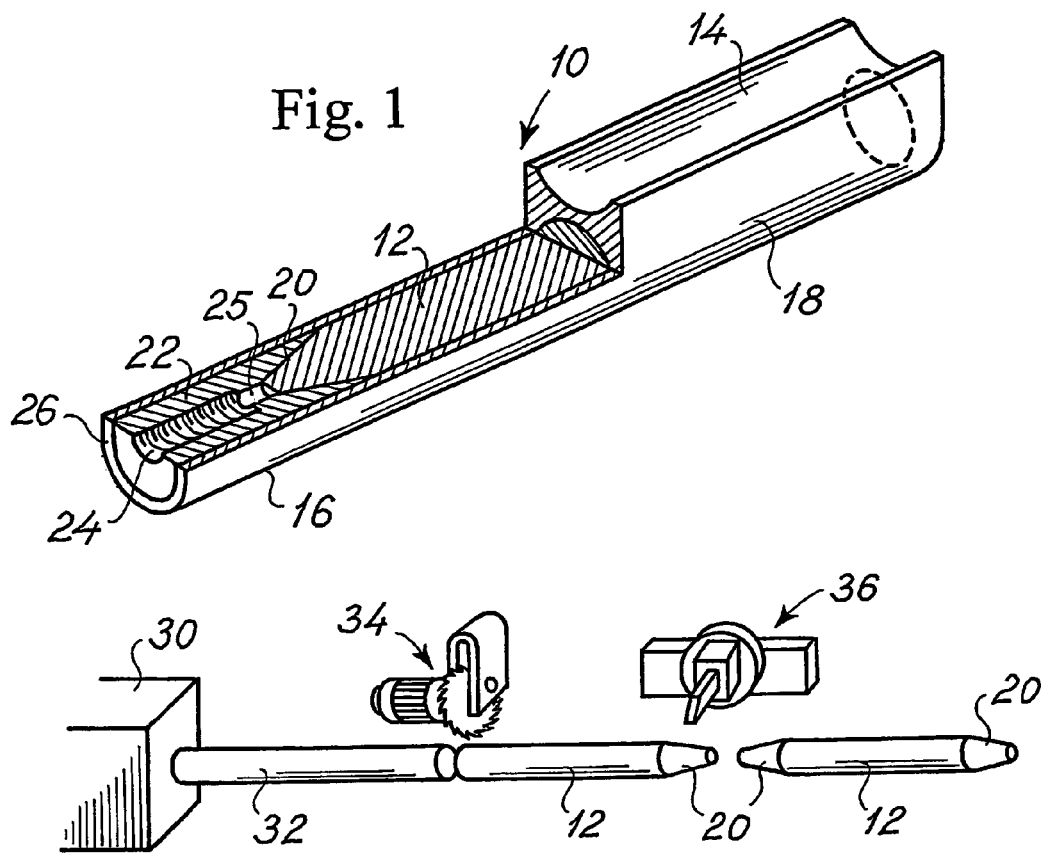
Fig. 1
Fig. 2
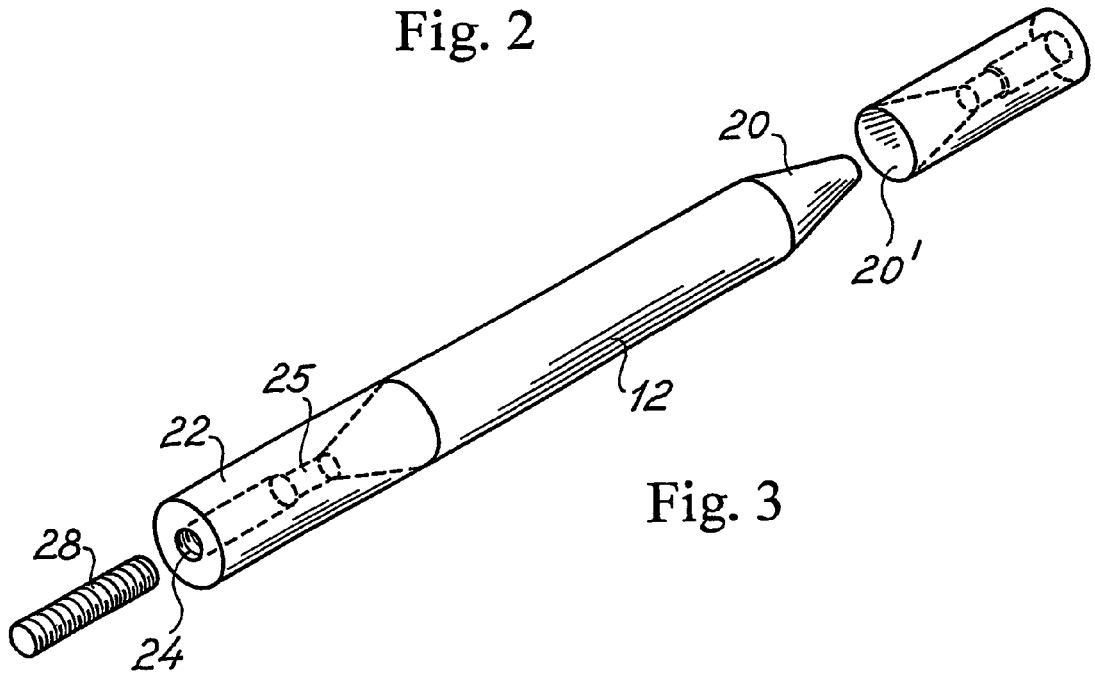
Fig. 3

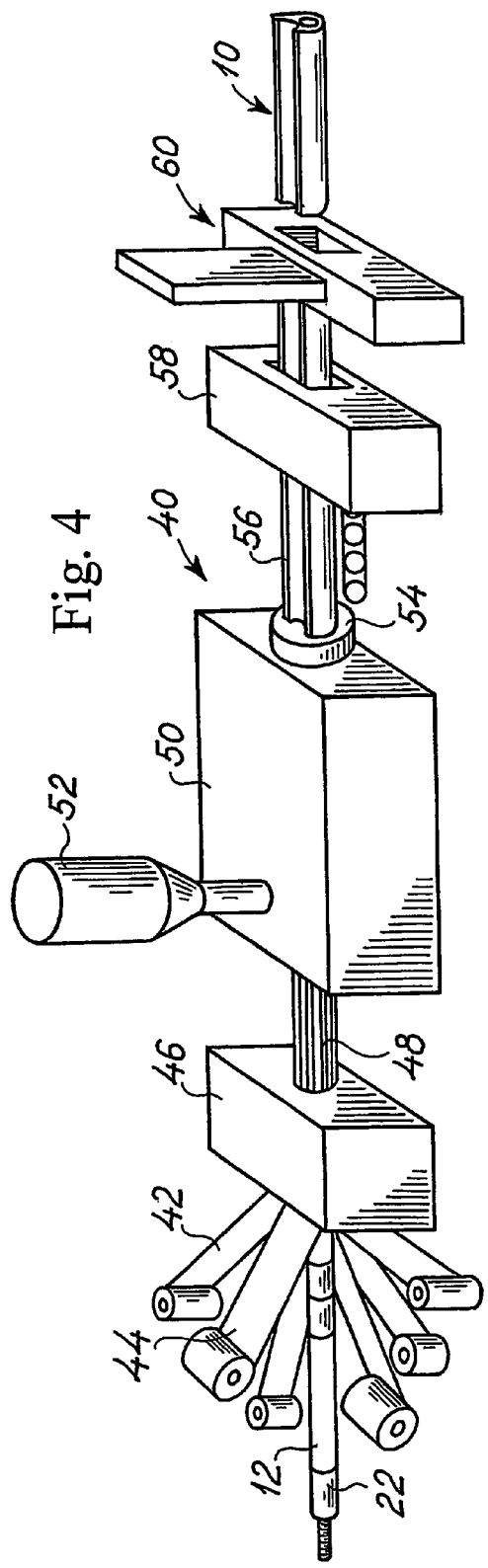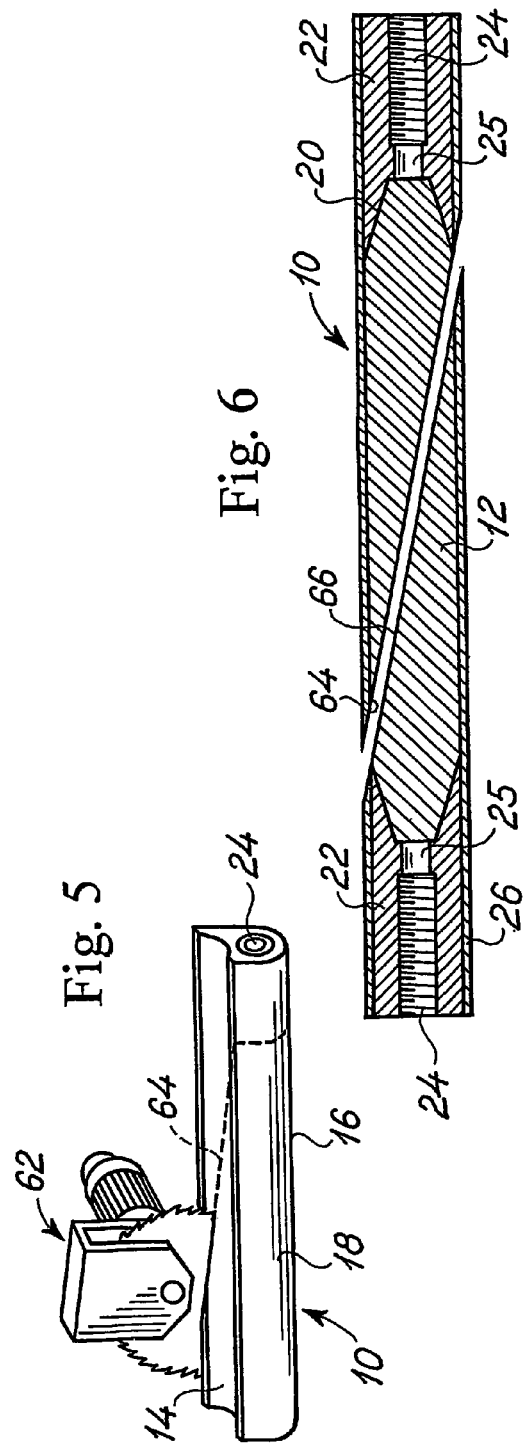

METHOD OF PRODUCING A FIBRE REINFORCED STRUCTURAL ELEMENT

This application is a 35 USC 371 of PCT/OK03/00010, filed Dec. 09, 2003.

BACKGROUND OF THE INVENTION

The present invention relates generally to the technique of producing large fibre reinforced structural elements and in particular a technique of fixating bolt fixtures or bolts in the fibre reinforced structural element.

In the present context, the term a fibre reinforced structural element is construed as a generic term comprising any structural element made from resin or plastics based materials being fibre reinforced by means of fibres such as glass fibre, carbon fibre or kevlar fibre reinforced structural elements produced from a resin material such as polyester, vinyl ester, phenol or epoxy. Further the structural element may in itself constitute a load-carrying element or a supporting element such as an element of a building structure, a facade element, a bridge, a component of a wind mill, a component of a ship such as a deck component.

In the present context, the terms a bolt fixture, a bolt and a fitting are to be construed as generic terms comprising any elements such as a bolt, the shaft of the bolt, a nut, a hook, a pin with external thread, an arresting element e.g. a press fitting or snap fitting closure element etc. serving the purpose of co-operating with another fixating element e.g. a congruent or mating fixating element for the fixation of a structural element which supports the bolt fixture, bolt or fitting, or a fitting including an internal thread or a differently configured body including a protruding outer thread part or an inner thread for receiving the thread of a bolt.

Within the industry the use of fibre reinforced structural elements has increased rapidly within the last decades, basically inspired by the success of the use of such elements within the wind mill industry. Apart from wind mill components such as the blades of a wind mill, fibre reinforced structural elements have also gained success within the house-building industry and ship-building industry and even within certain technical fields in which metal structures have conventionally been used. As an example within the chemical industry or the galvanising-and zinc coating industry, conventional metal structures tend to have a fairly short life time due to the excessive corrosion impact whereas fibre reinforced structural elements including containers, stairs, supporting elements, etc. may stand the exposure to the corrosive atmosphere without being to any substantial extent deteriorated or ruined.

Examples of structural elements and techniques of fixating various components within structural elements are described in the below patent applications and patents to which reference is made and which US patents are hereby incorporated in the present application by reference. The references comprise: EP 0 170 886, U.S. Pat. No. 4,892,462, U.S. Pat. No. 4,339,230, U.S. Pat. No. 4,278401, FR 2 758 594, FR 2 670 956, U.S. Pat. No. 5,664,820, U.S. Pat. No. 3,372,073, GB 2 119 472 and DE 196 25 426.

It has been realised by the applicant company that the technique of embedding and fixating bolt fixtures, bolts and/or fittings within a fibre reinforced element may impose certain problems in particular as far as the proper and accurate location of the bolt fixtures, bolts or fittings are concerned. Whereas the conventional technique has involved the simple positioning of bolt fixtures, bolts or fixtures within the fibre reinforced structural element to be machined, extruded or pulltruded in the production process, it has been realised by the applicant company that this conventional and simple technique does not allow the bolt fixtures, bolts or fittings to be positioned with the necessary accuracy needed within the industry and being a mandatory provision for the further commercial exploitation of the fibre reinforcing technique for the manufacture of structural elements.

SUMMARY OF THE INVENTION

An object of the present invention is to provide a novel technique allowing a simple and accurate positioning of bolts, bolt fixtures or fittings within a fibre reinforced structural element at predetermined positions or locations and with an accuracy acceptable within the industry including the house-building, ship-building and wind mill industry such as an accuracy of +/−1 mm variation of the location of a specific bolt, bolt fixture or fitting or even a lower variation such as a variation of +/−0.5 mm.

It is a feature of the present invention that the novel technique according to the present invention provides an improved transmission of force and impact to and from the fibre reinforced structural element through the bolt fixtures, bolts or fittings thereby allowing a reduction of the size of the fibre reinforced structure i.e. providing a reduction of the weight of the fibre reinforced structure or in the alternative a reduction of the materials used for the fibre reinforce structural element.

It is a further feature of the present invention that the method and technique according to the present invention allows bolt fixtures, bolts or fittings to be located at specific locations and fixated within a fibre reinforced structural element in solid and high-load bearing casings.

It is a particular advantage of the present invention that the novel technique of positioning and fixating bolt fixtures, bolts or fittings within a fibre reinforced structural element allows the use of high-load bearing casings for the positioning of the bolt fixtures, bolts or fittings and to provide an easy positioning of the bolt fixtures, bolts or fittings in specific geometrical configuration or shape generated by particularly configurating the load-bearing casing supporting the bolt fixtures, bolts or fixtures.

The above object, the above features and the above advantage together with numerous other objects, advantages and features which will be evident from the below detailed description of the present invention are according to a first aspect of the present invention obtained by a method of producing a fibre reinforced structural element including a plurality of bolt fixtures, bolts or fittings for the fixation of the structural element to another structural element, comprising the steps of:

i) providing an elongated core element of a material, preferably fibre reinforcement material compatible with the materials of the fibre reinforced structural element, preferably made through pulltrusion, having an end part for the mounting or fixation of one of the bolt fixtures, bolts or fittings, ii) mounting the one bolt fixture, bolt or fitting on the end part of the core element for producing a subassembly, iii) fixating the one bolt fixture, bolt or fitting relative to the end part of the core element in a pulltrusion process by pulling the subassembly through a pulltruder, by circumferentially covering the subassembly with reinforcing fibres and resin and by heating and curing the resin for causing the resin to provide in conjunction with the reinforcing fibres a casing circumferentially encircling the subassembly, or alternatively fixating the subassembly by adhesion to the encasing produced in a separate pulltrusion process, iv) machining the subassembly circumferentially encircled within the casing of the reinforcing fibres and the cured resin for providing a bolt fixture, bolt assembly or fitting assembly including the core element and the one bolt fixture, bolt or fitting and the core element, v) repeating the steps i-iv for producing a plurality of the bolt fixtures, bolt assemblies or fitting assemblies, vi) positioning the plurality of assemblies according to the intentional position of the plurality of bolt fixtures, bolts or fittings within the final fibre reinforced structural element, and vii) producing the fibre reinforced structural element including the plurality of bolt fixtures, bolts or fittings constituted by the pluralities of assemblies in an extrusion, a pulltrusion or a fibre reinforcing production technique.

According to the basic teachings of the present invention, the individual bolt fixture, bolt or fitting is pre-positioned in a casing within a bolt fixture, bolt or fitting assembly. The assembly itself is composed of a core element which is accurately positioned relative to the bolt fixture, bolt or fitting and in a separate production process step fixated relative to the bolt fixture, bolt or fitting in a puiltrusion process. It is to be emphasized that the fixation of the core element and the bolt fixture, bolt or fitting relative to one another does not necessitate a linking between the core element and the bolt fixture, bolt or fitting as the core element and the bolt fixture, bolt or fitting are mechanically fixated to the circumferentially encircling casing produced in the pulitrusion process, however the co-operation between the core element and the bolt fixture, bolt or fitting provides the necessary accuracy of positioning and fixation of the bolt fixture, bolt or fitting in the final structure. As will be described in greater details below, the use of the pulltrusion process for the production of the bolt fixture, bolt or fitting assembly allows the bolt fixture, bolt or fitting assembly to be manufactured in a specific metrical configuration promoting or ensuring the intended positioning of the individual bolt fixtures, bolts or fittings within the final fibre reinforced structural element. The production of the bolt fixture, bolt or fitting assembly also ensures the necessary load-bearing capability of the individual bolt fixture, bolt or fitting due to the pulltrusion process used for the fixation of the bolt fixture, bolt or fitting relative to the core element within the individual bolt fixture, bolt or fitting assembly.

The individual core element may be prefabricated e.g. through casting, machining, etc. from a material which is compatible with the materials of the fibre reinforced structural element meaning that the materials used for the core element and also for the pulltrusion process for the encasing of the subassembly comprising the bolt fixture and bolt and the core element are mechanically, structurally and chemically combinable with the materials of the fibre reinforced structural element. For most applications, the above described fibre reinforcing materials and resin materials are used and for obvious reasons, the bolt fixture, bolt or fitting assembly may be manufactured from materials compatible with the remaining materials of the fibre reinforced structural elements, however exhibiting improved strengths and load-bearing capability. Alternatively, the same materials may advantageously be used for the production of the bolt fixture, bolt or fitting assembly and for the remaining part of the fibre reinforced structural element.

Provided a none-pre-cast core element is used, the method according to the present invention preferably comprises the step of cutting the elongated core element from a continuous elongated core element body preferably made as already stated through pulltrusion.

The technique of mounting the one bolt fixture, bolt or fitting on the one end part of the core element may be easily accomplished provided the core element is configured including a recess, a bore or having a protruding part such as a fitting configured for the reception of the bolt fixture, bolt and fitting. According to a particular advantageous embodiment of the method according to the present invention, the elongated core element is provided with respective end parts for receiving a total of two bolt fixtures, bolts or fittings at opposite ends of the core element and the method according to the present invention consequently also comprises in steps ii) and iii) mounting and fixating two bolt fixtures, bolts or fittings at the respective end parts of the core element of the subassembly and comprises in step iv) machining the subassembly circumferentially encircled within the casing of the reinforcing fibres and the cured resin into two halves each constituting a bolt fixture, bolt or fitting assembly.

According to a still further advantageous embodiment of the method according to the present invention, the proper positioning, fixation and orientation of the bolt fixture, bolt or fitting relative to the core element is obtained by machining the end part of the core element into a specific configuration and providing the bolt fixture, bolt or fitting having an end recess part configurated in conformity with and congruent with the conical configuration of the end part of the core element, thereby providing an accurate positioning and maintenance of the bolt fixture, bolt or fitting relative to the core element before and while performing the pulltrusion process in step iii).

According to a further particular advantageous aspect of the method or technique according to the present invention, the casing including the core element and the bolt fixture, bolt or fitting of the assembly may be produced in a specific configuration through the pulltrusion process as the casing may be produced having a specific cross-sectional configuration such as a circular, an elliptical, a polygonal, in particular a hexagonal or square cross-sectional configuration or alternatively a combination of any of the above mentioned cross-sectional configurations.

Alternatively, the intentional geometrical configuration of the casing may be obtained by a separate machining step in which the casing is machined into a specific cross-section or configuration such as a circular, an elliptical, a polygonal, in particular a hexagonal or square cross-sectional configuration or alternatively a combination of any of the above mentioned cross-sectional configurations.

In a first embodiment of the method according to the first aspect of the present invention, the machining performed in step iv) is carried out by simply cutting vertically through the string of material provided from the pulltrusion process and the bolt fixture, bolt or fitting assembly is consequently provided having an end surface opposite to the bolt fixture, bolt or fitting fixated to the core element of the assembly extending perpendicular to the longitudinal axis of the bolt fixture, bolt or fitting assembly. According to the presently preferred embodiment of the method according to the first aspect of the present invention, the assembly is, however, provided in the machining process having a surface part defining an acute angle relative to the longitudinal axis of the bolt fixture, bolt or fitting assembly for providing a large surface of contact of the core element for fixating the assembly within the fibre reinforced structural element, and further for providing a none-rotationally symmetrical assembly which is optimally configured for fixation within the fibre reinforced structural element.

The above object, the above features and the above advantage together with numerous other objects, advantages and features which will be evident from the below detailed description of the present invention are according to a second aspect of the present invention obtained by a method of producing a bolt fixture, bolt assembly or fitting assembly for use in a fibre reinforced structural element including a plurality of bolt fixtures, bolts or fittings for the fixation of the structural element to another structural element, comprising the steps of:

i) providing an elongated core element of a material, preferably fibre reinforcement material compatible with the materials of the fibre reinforced structural element, preferably made through pulltrusion, having an end part for the mounting or fixation of one of the bolt fixtures, bolts or fittings, ii) mounting the one bolt fixture, bolt or fitting on the end part of the core element for producing a subassembly, iii) fixating the one bolt fixture, bolt or fitting relative to the end part of the core element in a pulltrusion process by pulling the subassembly through a pulltruder, by circumferentially covering the subassembly with reinforcing fibres and resin and by heating and curing the resin for causing the resin to provide in conjunction with the reinforcing fibres a casing circumferentially encircling the subassembly, or alternatively fixating the subassembly by adhesion to the encasing produced in a separate pulltrusion process, and iv) machining the subassembly circumferentially encircled within the casing of the reinforcing fibres and the cured resin for providing a bolt fixture, bolt assembly or fitting assembly including the core element and the one bolt fixture, bolt or fitting and the core element.

The method according to the second aspect of the present invention may according to the teachings of the present invention advantageously comprise any of the features described and discussed above in relation to the method according to the first aspect of the present invention.

The above object, the above features and the above advantage together with numerous other objects, advantages and features which will be evident from the below detailed description of the present invention are according to a third aspect of the present invention obtained by a fibre reinforced structural element including a plurality of bolt fixtures, bolts or fittings for the fixation of the structural element to another structural element, the fibre reinforced structural element being produced in accordance with the method according to the first aspect of the present invention and including a plurality of bolt fixture, bolt or fitting assemblies produced in accordance with the method according to the second aspect of the present invention.

The above object, the above features and the above advantage together with numerous other objects, advantages and features which will be evident from the below detailed description of the present invention are according to a fourth aspect of the present invention obtained by a bolt fixture, bolt or fitting assembly for use in a fibre reinforced structural element being produced in accordance with the method according to the second aspect of the present invention.

BRIEF DESCRIPTION OF THE DRAWINGS

The present invention is now to be further described with reference to the drawings, in which FIG. 1 is a partly sectional, perspective and schematic view of a first embodiment of an assembly from which two bolt fixture, bolt or fitting assemblies produced.

FIG. 2 is a schematic and perspective view illustrating a first step of a method of producing the assembly shown in FIG. 1 including machining a pulltruded body into a plurality of core elements, FIG. 3 is a schematic and perspective view illustrating a second step of the method of producing the assembly shown in FIG. 1 including mounting bolt fixtures at opposite ends of the core element produced in the step shown in FIG. 2, FIG. 4 is an overall perspective and schematic view illustrating a third step of the method of producing the assembly shown in FIG. 1 constituting a process of providing in a continuous pulltrusion process a body from which the assembly shown in FIG. 1 is cut as is illustrated in the right-hand part of FIG. 4, FIG. 5 is a schematic view illustrating a step of cutting the assembly shown in FIG. 1 and in the right-hand part of FIG. 4 into two bolt fixture assemblies, FIG. 6 is a vertical sectional view illustrating the assembly shown in FIG. 1 and the bolt fixture assemblies produced from the assembly as shown in FIG. 5.

DETAILED DESCRIPTION OF THE INVENTION

Figure 7:
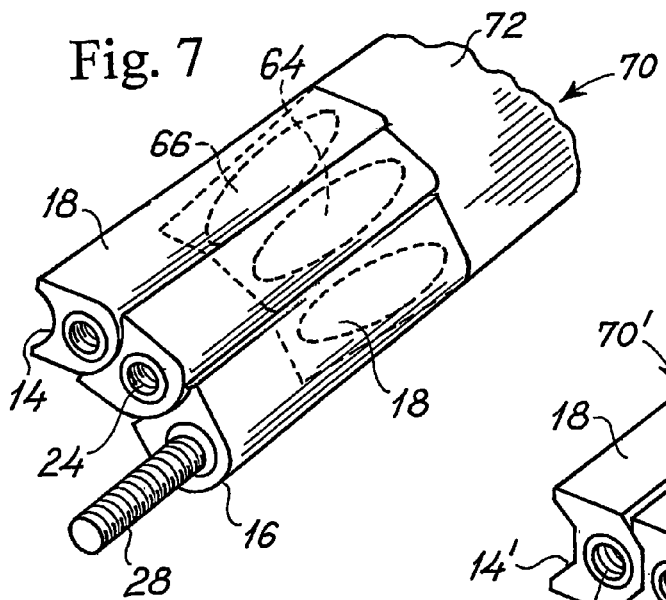
FIG. 7 is a schematic view illustrating the intentional application of the bolt fixture assembly shown in FIGS. 5 and 6 for the production of a major fibre reinforced structure such as a wind mill element, a bridge part, a building element, the bolt fixtures being positioned along the arch of a circle.

In FIG. 1, an assembly 10 is shown produced in accordance with the method according to the present invention and intended to be separated into two assemblies as will be described below with reference to FIGS. 5 and 6.

According to the method of producing an assembly including a bolt fixture of bolt for use in a fibre reinforced structural element, a core element is initially produced. The core element may be produced form any relevant material including plastics based materials, wood or metal or composite materials which materials are compatible with the materials of the fibre reinforced structural element meaning that the materials of the core element like all other materials used in accordance with the technique of the present invention are combinable with the remaining materials i.e. do not react with one another in a chemical process, and a mechanically combinable or linkable meaning that the materials may be joined together in an integral structure and preferably exhibit substantial identical mechanical characteristics as far as coefficients of expansion, and mechanical strength such as tear and shear strengths are concerned. In accordance with the presently preferred embodiment of the method according to the present invention, a pulltruded core body is preferably used as is illustrated in FIG. 2.

In FIG. 2, a pulltruder is designated by the reference numeral 30 in its entirety and delivers from its output a puiltrusion rod 32 i.e. a rod of circular cylindrical cross-sectional configuration made from resin such as a polyester, vinyl ester or phenol or epoxy resin in which reinforcing fibres such as glass fibre, carbon fibre or Kevlar® fibres are embedded. The pulltrusion rod or body 32 is cut into individual elements one of which is designated by the reference numeral 12 by means of a cutter illustrated schematically as a saw 34. At opposite ends of the body or rod 12, conical end parts are produced by means of a machining device such as a cutter 36 illustrated schematically in FIG. 2. The cutter 36 produces the conical end parts designated by the reference numeral 20 at opposite ends of the core body 12.

In a further step of the method of producing the assembly 10 shown in FIG. 1, bolt fixtures 22 are positioned at opposite ends of the core element 12 as is illustrated in FIG. 3.

Like the core element 12, the bolt fixtures 22 are preferably of a circular cylindrical cross-sectional configuration having at the one end a conical recess 20' configured in conformity with the conical end part 20 of the core element 12. Each of the bolt fixtures 22 is further provided with a through-going bore communicating with the conical recess 20' and defining a narrow central cylindrical bore part 25 and a wider bore part 24 communicating with the exterior and intended to co-operate with a threaded shaft 28 as is illustrated in the lower left-hand part of FIG. 3. The bolt fixtures may be differently configured as the bolt fixtures may e.g. be of an overall conical configuration tapering from the one end towards the other end e.g. from the outer end towards the inner end or from the inner end towards the outer end. Alternatively, the bolt fixtures 22 may be provided with outwardly pulltruding flanges. Further alternatively, the bolt fixtures may have a differently configured through-going bore in which the threaded bore part communicates with the conical recess without the intermediate narrow cylindrical bore part. Further alternatively, the threaded bore may be omitted as the bolt fixture may be provided as a fixture having an outwardly pulltruding threaded shaft constituting a bolt.

By the provision of the co-operating conical end part and the conical recess 20' of each of the bolt fixtures 22, a self-centering and self-aligning feature is obtained as the bolt fixtures 22 due to the co-operation between the conical end part 20 and the conical recess 20' tend to be maintained in the intentional aligned orientation in which the circular cylindrical bolt fixtures 22 are constituting cylindrical continuations of the central part of the core element 12.

The subassembly comprising the core body and the two bolt fixtures 22 illustrated in FIG. 3 is, as is illustrated in FIG. 4, introduced into a pulltrusion apparatus 40 comprising a receiving section 46 in which the subassembly described above along with a plurality of subassemblies together constituting a continuous string is introduced into the receiving section 46 of the pulltrusion apparatus 40 together with webs of fibre reinforcing materials which webs are shown in the left-hand part of FIG. 4 and two of which are designated the reference numerals 42 and 44. From the receiving section 46, a string 48 including the aligned subassemblies circumferentially encircled by the fibre reinforcing materials is introduced into a resin applicator and resin heating and curing apparatus 50 communicating with a resin reservoir 52 for the supply of resin thereto. An output die of the apparatus 50 is designated the reference numeral 54 and provides a specific configurated shaping of the of a pulltrusion string 56 delivered from the die 54 apparatus 50 which string 56 is introduced into a puller apparatus 58 for pulling the pulltrusion string from the die 54 of the apparatus 50.

From the puller 58, the string 56 is delivered to a cutter 60 which separates the string 56 into distinct sections constituting the assembly 10 also shown in FIG. 1 as the cutting of the string 56 in the sections or assemblies 10 is synchronised with the entry of the subassembly comprising the core body 12 provided with the end part covering bolt fixtures 20 to the entry end of the pulltrusion apparatus 40. In an alternative process of producing the subassembly from which the assembly 10 shown in FIG. 1 is produced, the bolt fixtures 20 and the core element 12 are fixated through adhesion to a cylindrical casing preferably produced through pulltrusion and constituting the casing 26 described above. It is contemplated that the fixation through adhesion to the casing 26 produced through pulltrusion and the technique of fixating the bolt fixtures 22 and the core element 12 to the casing through the pulltrusion process are constituting technical equivalencies.

In FIG. 1, the core element 12 is shown together with the bolt fixture 22 disclosing the threaded bore 24 communicating with the bore 25 and further disclosing the tapering or conical end part 20 of the core element 12.

In FIG. 1, the outer casing produced in the pulltrusion process described above with reference to FIG. 4 is also disclosed, which casing is designated the reference numeral 26. FIG. 1 further discloses the configuration of the assembly 10 which configuration defines a concave top-surface 14, an opposite convex or circular cylindrical bottom surface 18 and opposite parallel planar surfaces 18. The convex/concave configuration illustrated in FIG. 1 allows, as will be described below with reference to FIGS. 7 and 10, the positioning of the bolt fixture assembly produced from the assembly 10 by arranging the convex outer surface 16 or one bolt fixture assembly juxtaposed and partly received within the concave surface 14 of the adjacent bolt fixture assembly.

From the assembly 10 shown in FIG. 1, two bolt fixture assemblies are produced as is illustrated in FIG. 5 by cutting the assembly 10 into two parts along a line indicated in dotted line by the reference numeral 64. The cutter is schematically illustrated by a saw 62. The assembly 10 cut into two halves is illustrated in FIG. 6 in a vertical sectional view disclosing the line of separation 64 providing opposite sloping surfaces 66 of each of the two bolt fixtures assemblies produced from the assembly 10. Each bolt fixture assembly constituting one half of the assembly 10 includes a tapering cut part of the core element 12 and the bolt fixture 22 fixated to the core element 12 by the pulltrusion encasing 26. By provision of the sloping surface 66 an irregularly shaped bolt fixture assembly is produced enhancing the ability of fixation of the bolt fixture assembly within the final fibre reinforce structure and further providing a major surface of contact between the central core element 12 and the final fibre reinforced structure.

The ability of positioning the individual bolt fixture assemblies in an orientation different from a rectilinear orientation is illustrated in FIG. 7 as three individual bolt fixture assemblies combined into a structure in its entirety designated by the reference numeral 70 is shown and including three bolt fixture assemblies positioned having the concave surface 14 of one bolt fixture assembly receiving the convex surface 16 of the adjacent bolt fixture assembly in an overall angular orientation. The fibre reinforced structure encasing the composite structure shown in FIG. 7 is designated the reference numeral 72.

Figure 8:
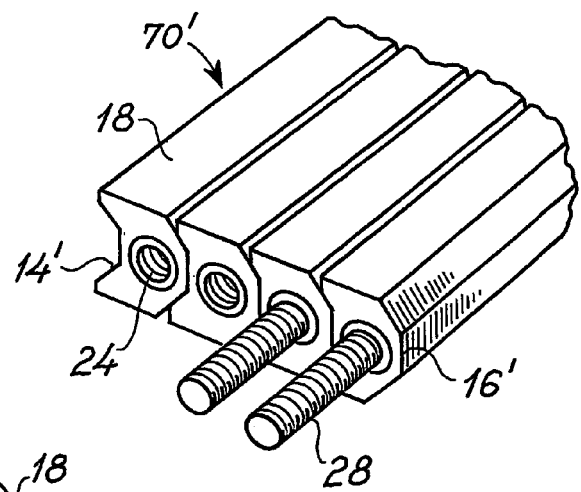
FIG. 8 is a perspective and schematic view similar to the view of FIG. 7 illustrating a slightly modified embodiment of the bolt fixture assembly used for the production of a fibre reinforced element in which the bolt fixtures are positioned along a rectilinear track.

In FIG. 8, a slightly modified configuration of the bolt fixture assembly is illustrated as the circular concave and convex surfaces 14 and 16 are substituted by concave and convex outer surfaces having planar generators. By the planar generator configuration of the convex surface 14' having a configuration corresponding to the configuration of the convex surface 16' of the blot fixture assemblies, the individual bolt fixture assemblies may, as is illustrated in FIG. 8, be combined into a structure in which the proper rectilinear positioning of individual bolt fixture assemblies is ensured and maintained by the provision of the corresponding convex and concave surfaces of the bolt fixture assemblies. The combination of a total of four bolt fixture assemblies in FIG. 8 is in its entirety designated the reference numeral 70'. From the composite structure illustrated in FIG. 8, a fibre reinforced structural element is produced in a further extrusion, pulltrusion or manual or automated fibre reinforcing production process by the application of reinforcing fibres and resin to the combination of the fixture assemblies and configurating the structural element according to the intentional geometrical of the final product.

Figure 9:
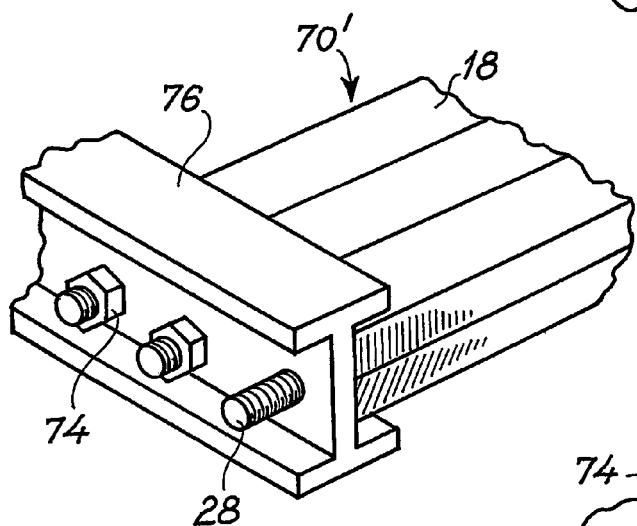
FIG. 9 is a perspective and schematic view of a segment of a structural element produced from the assembly shown in FIG. 8 illustrating the fixture of the fibre reinforced structural element to an I-beam by means of bolts and knots.

The final product is used e.g. as illustrated in FIG. 9 in connection with a load-bearing carrier I-beam 76 in which the bolt shafts 28 received within the bolt fixtures of the bolt fixture assemblies shown in FIG. 8 are fixated to the I-beam 76 by means of individual bolts 74.

Figure 10:
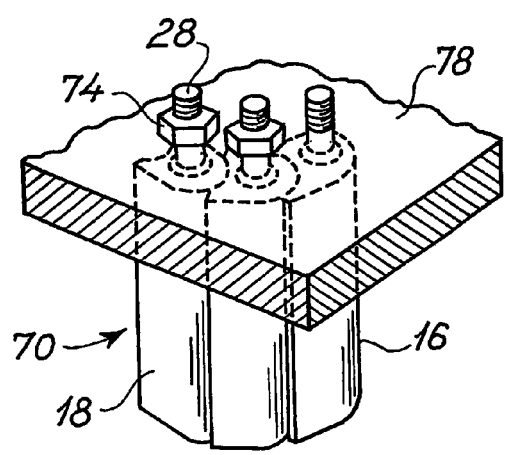
FIG. 10 is a perspective and schematic view illustrating the fixation of the fibre reinforced structural element produced from the assembly shown in FIG. 7 having the bolt fixtures positioned along the arch of a circle.

The curved structure shown in FIG. 7 may alternatively be used for the fixation to e.g. a planar plate element 78 as illustrated in FIG. 10.

Figure 11A:
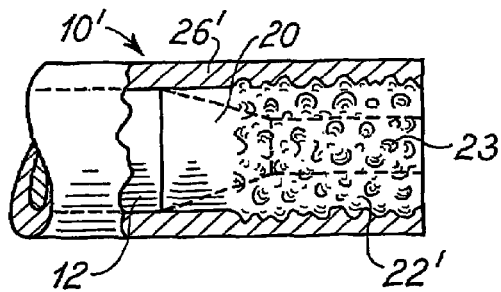
FIGS. 11a, 11b and 11c are perspective, schematic and partly sectional views illustrating three alternative embodiments of improving the fixation of the bolt fixtures in the pulltrusion process.
Figure 11B:
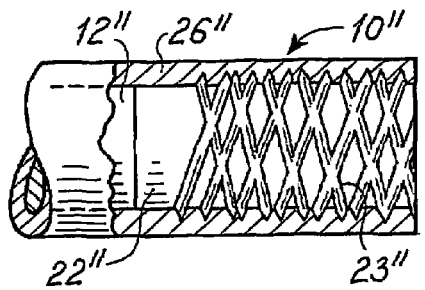
Figure 11C:
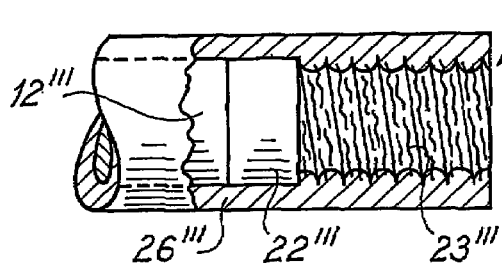

As mentioned above, the bolt fixtures 22 described above with reference to FIGS. 1-6 may advantageously be configurated in a conical or elliptical shape for improving the fixation of the bolt fixtures within the pulltrusion encasing 26. In FIGS. 11a-11c, different techniques of enhancing the fixation of the bolt fixtures within the pulltrusion encasing are illustrated. Generally throughout the specification, components or elements identical to components or elements described previously are designated the same reference numerals as previously designated whereas components or elements geometrically differing from previously described components or elements, respectively, however serving the same purpose of previously described components or elements are designated the same reference integer, however added a marking for identifying the geometrical difference.

In FIG. 11a, the bolt fixture 22' differs from the above described bolt fixture 22 shown in FIG. 3 in that the outer surface of the bolt fixture 22' is of a rough or rugged structure providing an uneven outer surface which improves the fixation of the bolt fixture 22' to the pulltrusion casing 26'. In FIG. 11 a the rough or rugged outer surface of the bolt fixture 22' is for the sake of clarity somewhat exaggerated as compared to real life rough or rugged surfaces.

In FIG. 11b, a different technique of enhancing the fixation of the bolt fixture 22' relative to the pulltrusion encasing 26" is shown as the bolt fixture 22" is provided with outer ridges defining a plurality of outer threads of left and right hand configuration serving the purpose of providing a solid embedding of the ridges within the polymer material of the outer pulltrusion encasing 26".

In FIG. 11c, a further alternative technique of improving the adhesion between the bolt fixture 22''' and the pulltrusion encasing 26''' is shown. In FIG. 11c, the outer end of the bolt fixture 22''' is provided with an outer shallow thread 23''' in which reinforcing fibres and resin are received before the bolt fixture 22''' together with the core body 12''' are moved through the pulltruder such as the pulltruder further shown in FIG. 4.

Figure 12A:
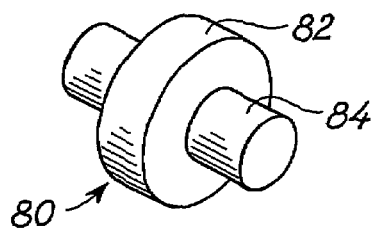
FIGS. 12a and 12b are perspective and schematic views illustrating a distance element and the use of a distance element in the pulltrusion process.

In order to facilitate the cutting of the string from which the assemblies according to the present invention are cut such as the string 56 shown in FIG. 4, a distance body such as the body 80 shown in FIG. 12a may be used. Centrally the body 80 comprises centrally a circular cylindrical disc 82 from opposite sides of which two coaxially extending pins 84 protrude. The body 80 is generally used in combination with the bolt fixtures such as two bolt fixtures $22^{iv}$ shown in 12b for keeping the adjacent ends of the bolt fixtures $22^{iv}$ spaced apart and allowing the cutter to be easily moved through the outer pulltrusion encasing, not shown in FIG.

12b, and through the distance body 80 which is preferably a pre-cast plastics body such as a PE, PP or similar plastics material body.

Figure 14A:
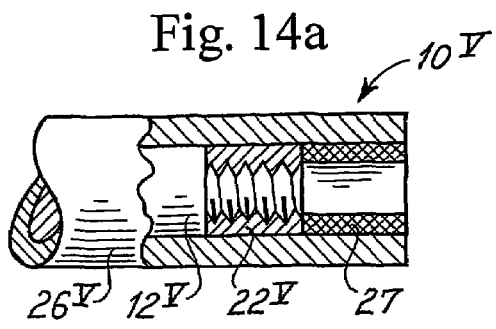
FIGS. 14a and 14b are schematic, perspective and partly sectional views illustrating differently configured bolt fixtures fixated within the pulltrusion end casing.

In FIG. 14a, a technique of using a carbon reinforced fitting in combination with a nut is shown. In FIG. 14a, a nut $22^v$ is encased within the pulltrusion encasing $26^v$ at the outer end of the core body $12^v$. In registration with the nut $22^v$ a carbon fibre reinforced cylindrical bushing or fitting 27 is enclosed within the pulltrusion encasing $26^v$ for allowing the nut $22^v$ to be kept spaced apart from the outer end of the assembly $10^v$ and at the same time through the provision of the carbon fibre reinforced bushing 27 providing a rigid assembly.

Figure 14B:
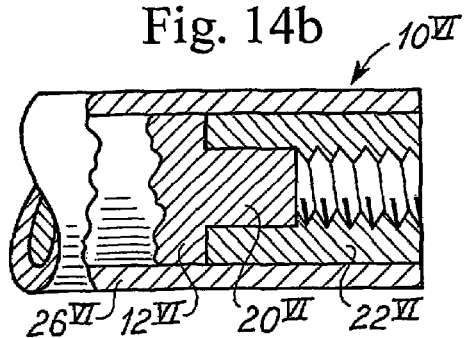

In FIG. 14b, a different technique of centring the bolt fixture relative to the core body is illustrated as the core body $12^{vi}$ is provided with an outer coaxially arranged pin $20^{vi}$ on which a bolt fixture or nut $22^{vi}$ is mounted.

Figure 13:
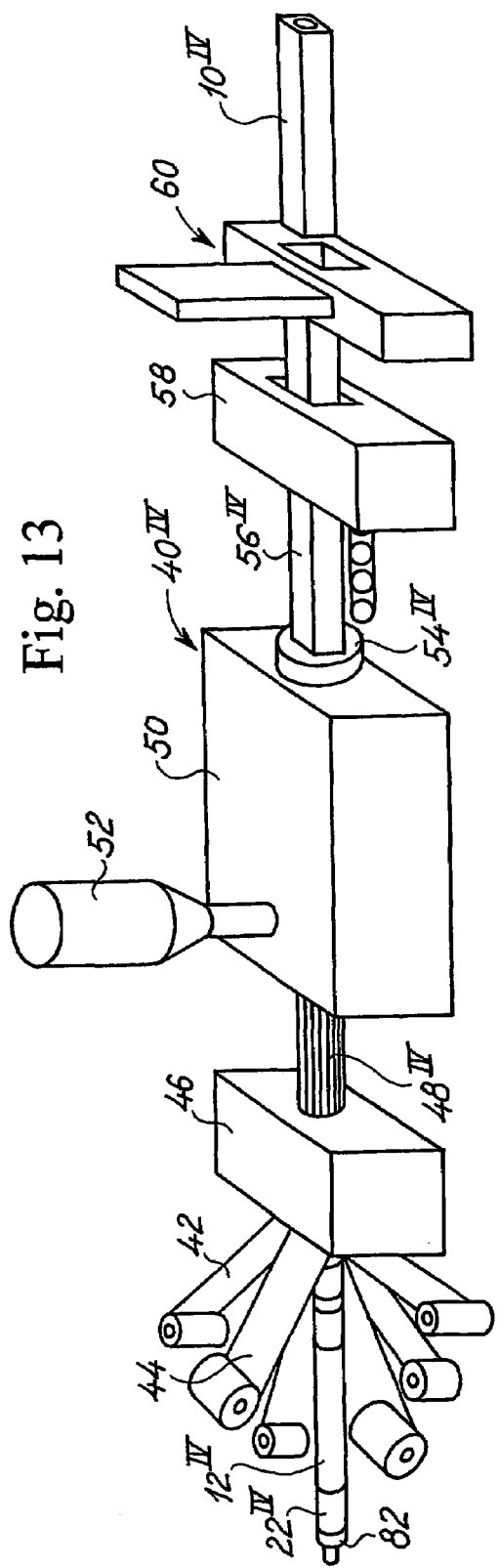
FIG. 13 is an overall perspective and schematic view similar to the view of FIG. 4 illustrating the method of producing a presently preferred assembly having a square cross-sectional configuration.

In FIG. 13, a pulltrusion apparatus $40^{iv}$ is shown, basically corresponding to the pulltrusion apparatus 40 described above with reference to FIG. 4, however differing from the above described apparatus in that in the receiving section 46, the string of core bodies $12^{iv}$ and bolt fixtures $22^{iv}$ further includes the distance bodies 42 for the production of the string $48^{iv}$ including the bolt fixtures $22^{iv}$ kept in spaced apart relationship by means of distance bodies 82.

From the curing apparatus 50, a string $56^{iv}$ is supplied having a square cross section or configuration as distinct from the above described configuration of the assembly 10.

Figure 12B:
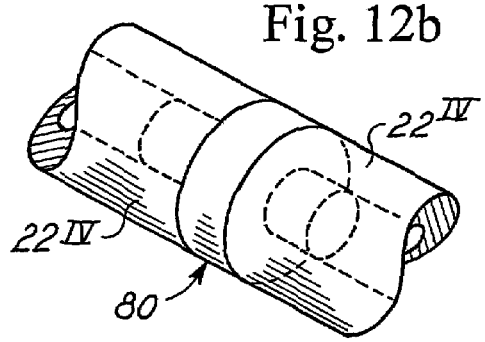

The technique of providing a distance body 80 for the maintenance of the outer ends of the bolt fixtures $22^{iv}$ described above with reference to FIG. 12b may be amended for keeping the outer ends of the bolt pins received within the bolt fixtures in spaced apart relationship.

Figure 15:
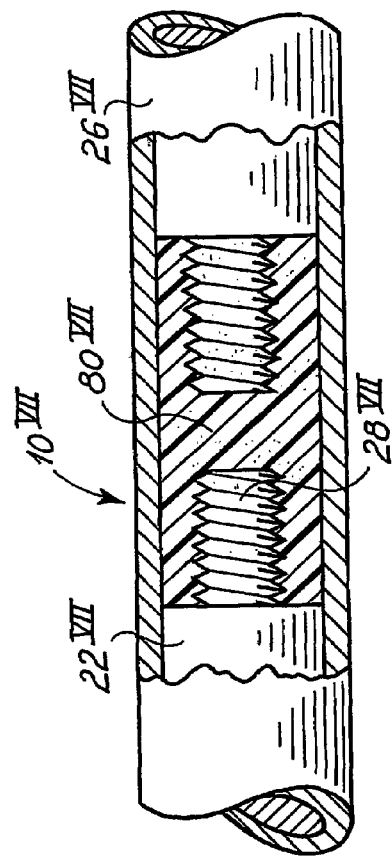
FIG. 15 is a perspective, schematic and partly sectional view of two adjacent parts of an assembly from which end parts two assemblies having protruding bolt pins are produced.

In FIG. 15, a pre-cast plastics material body $80^{vii}$ is provided constituting a circular cylindrical configuration having an outer diameter corresponding to the outer diameter of the bolt fixtures $22^{vii}$ and having threaded bores for the receiving of the outer ends of the bolt pins $28^{vii}$. After the finalising of the pulltrusion process with the pulltrusion apparatus such as the apparatus shown in FIG. 4 or alternatively in FIG. 13, the pulltrusion string is cut e.g. by means of the cutter 10 as illustrated in FIGS. 4 and 13 as the cutter is moved into the spacing between the two outer ends of the bolt pins $28^{vii}$ received within the distance body $80^{vii}$.

Figure 16A:
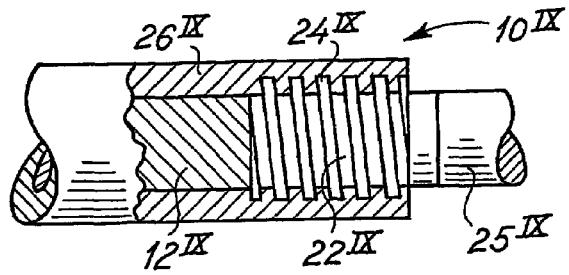
FIGS. 16a and 16b are perspective, schematic and partly sectional views similar to the view of FIG. 15 of a further embodiment of the assembly according to the present invention in which embodiment a fitting is embedded within the pulltrusion encasing for the generation of an internal thread within the pulltrusion casing.
Figure 16B:
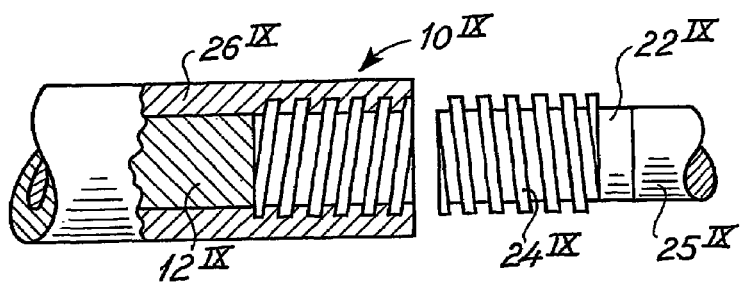

The integral pulltrusion technique according to the present invention also allows the usage of the fitting integrally pulltruded into the assembly according to the present invention to be used as a generator e.g. for the generation of an inner thread within the pulltrusion encasing as is illustrated in FIGS. 16a and 16b.

In FIG. 16a, an end part of an assembly $10^{ix}$ according to the present invention is shown including a pulltrusion encasing $26^{ix}$ in which a core body $12^{ix}$ is encased together with a generator body $22^{ix}$ which body is composed of a shaft $25^{ix}$ extending from the outer end of the assembly $10^{ix}$ and including a coarse thread $24^{ix}$ which is embedded within the pulltrusion encasing $26^{ix}$. The outer surface of the thread $24^{ix}$ of the generator fitting $22^{ix}$ is provided with a slip coating such as a PTFE coating, a powder covering or a greasy surface coating allowing the generator fitting $22^{ix}$ to be removed from the outer end of the assembly $10^{ix}$ as is illustrated in FIG. 16b in which the generator fitting $22^{ix}$ is disengaged from the remaining part of the assembly $10^{ix}$, exposing the inner thread of the pulltrusion encasing $26^{ix}$ originally generated by the external thread $24^{ix}$ of the generator fitting $22^{ix}$.

Figure 17:
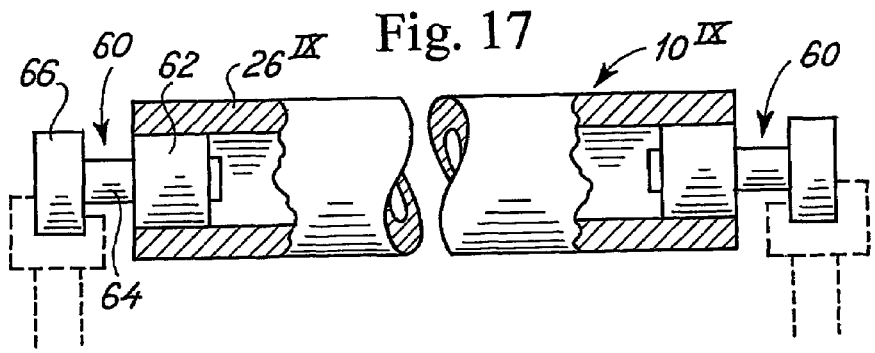
FIG. 17 is a perspective, schematic and partly sectional view of a further application of the assembly according to the present invention used as a roller of a roller belt.

The pulltrusion encasing $26^{ix}$ may be used for receiving e.g. a part of a roller bearing such as a roller bearing 60 illustrated in FIG. 17 and received within the pulltrusion encasing $26^{ix}$ of the assembly $10^{ix}$, e.g. by means of the threads shown in FIGS. 16a and 16b or alternatively fixated relative to the inner wall of the pulltrusion encasing $26^{ix}$ by means of an adhesive filling out the cavities of the inner thread of the pulltrusion encasing $26^{ix}$ as originally generated by the generator fitting $22^{ix}$. The roller bearing 60 comprises a roller bearing part 62 fixated to the outer end of the assembly $10^{ix}$ as already described and connected through a shaft 64 to a roller reel 66 supported on e.g. a stand or similar support. At the opposite end of the assembly $10^{ix}$ a similar roller bearing 60 is provided. The structure shown in FIG. 17 may e.g. be used for production plants in which a roller band is used and which roller band on the one hand may stand exposure to aggressive liquids or gasses and on the other hand may provide a light weight structure which is easily moved from one location to another.

Figure 18:
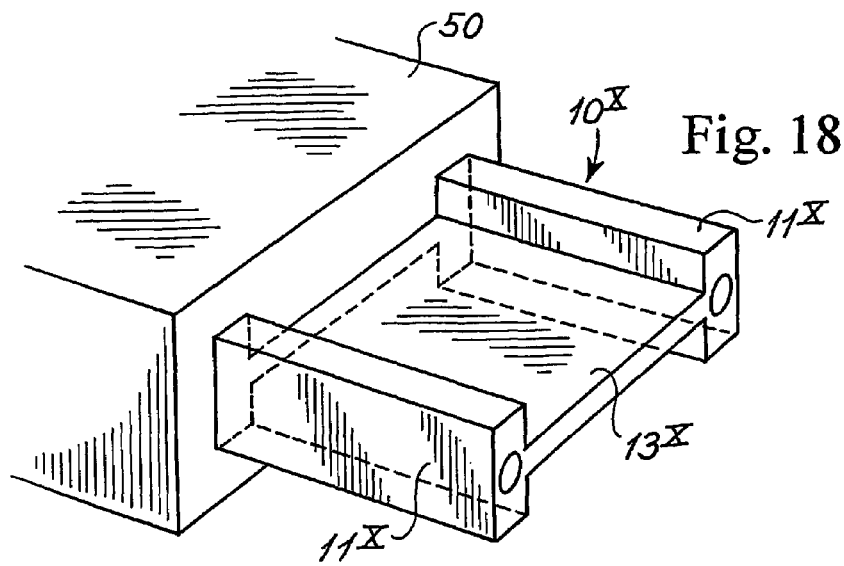
FIG. 18 is a schematic and perspective view of a differently configured assembly produced in accordance with the method as illustrated in FIG. 13 and shaped in an H-beam configuration.

The integral pulltrusion production technique described above also allows the manufacture of elaborated configurated structural elements such as a H-shaped structure element $10^x$ shown in FIG. 18 which is expelled from the curing apparatus 50 of a pulltrusion apparatus similar to the apparatus described above with reference to FIGS. 4 and 13. In the H-shaped assembly shown in FIG. 18 two vertical bars are included each having integrally included bolt fixtures, bolts or fittings for allowing the H-shaped element to be fixed to another building structure. Each of the vertical bars of the assembly $10^x$ is designated the reference numeral $11^x$ and the horizontal web interconnecting the two vertical bars in the H configuration is designated the reference numeral $13^x$.

Figure 19:
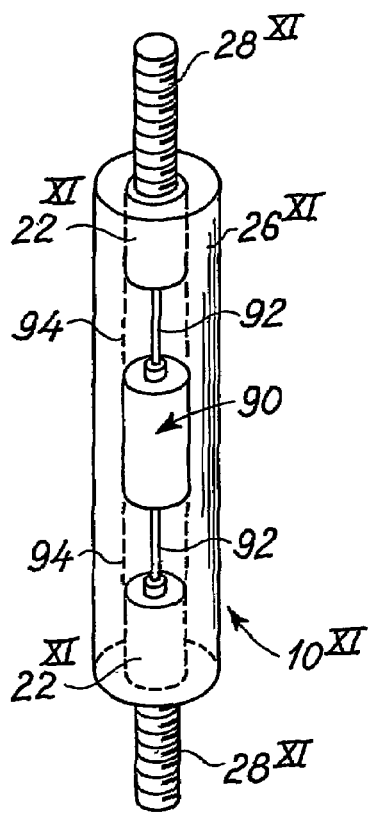
FIG. 19 is a perspective and schematic view illustrating the utilisation of the technique of producing a loadbearing assembly in accordance with the teachings of the present invention for use as a load sensor.
Figure 20:
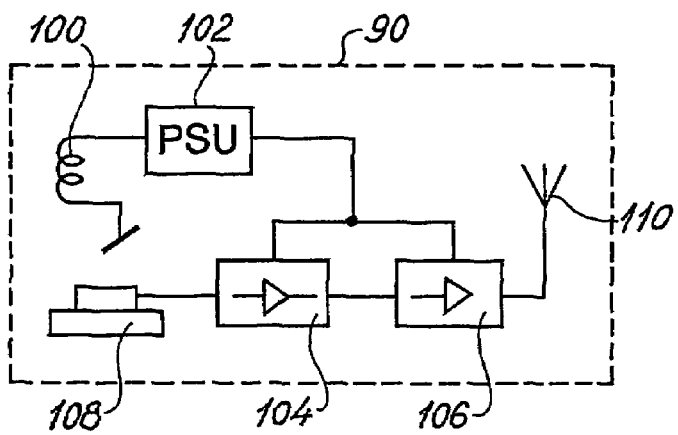
FIG. 20 is a diagram illustrating the electronics of the load sensor part of the assembly illustrated in FIG. 19.

The technique of providing a load carrying assembly having fittings, bolt fixtures or bolts positioned at opposite ends for allowing the element or assembly to be used as a load carrying element according to the teachings of the present invention may further be combined with the technique of measuring the load carrying capability of the element by integrating a sensor such as a strain gauge or similar impact detecting sensor into the assembly according to the present invention. In FIG. 19, an assembly $10^{xi}$ is shown having two threaded pins $28^{xi}$ extending from opposite ends of a circular cylindrical pulltrusion encasing $26^{xi}$. Within the pulltrusion encasing $26^{xi}$ two bushings $22^{xi}$ are encased for receiving the threaded pins $28^{xi}$ Centrally within the pulltrusion encasing $26^{xi}$, a load detector sensor unit 90 is received. The load detector sensor 90 may include a strain gauge or similar impact detecting element and may be implemented as is illustrated in FIG. 20. The load detector sensor unit 90 is connected by two pins 92 to the bushings $22^{xi}$ for the transmission of the load from the bushings $22^{xi}$ to the load detector unit 90. The load-transmitting pins 92 are each encased within a cylindrical encasing as is indicated in dotted line in FIG. 9 and designated the reference numeral 94.

The load detector sensor unit may be implemented as is illustrated in FIG. 20 included an induction loop 100 for receiving electrical power through induction from an external energising source, which induction loop is connected to a power supply unit 102 for the supply of electrical power to electronic circuitry blocks 104 and 106. The block 104 constitutes an input amp-stage receiving an input signal from a sensor element such as a strain gauge 108 and delivers on its output signal to a transmitter stage 106 which emits a radio wave signal to a remote receiver by means of an aerial 110. It is to be realised that the circuitry included in the load detector sensor unit 90 described above with reference to FIG. 20 may include any conventional signal shaping or signal conversion elements such as non-linear amplification stages, a/d converter stages etc. The technique of providing remote data locking units is well known in the art and no detailed description of the electronic circuitry of the load detector sensor element itself is being given as the implementation of the load detector sensor unit 90 itself is no part of the present invention.

Figure 21:
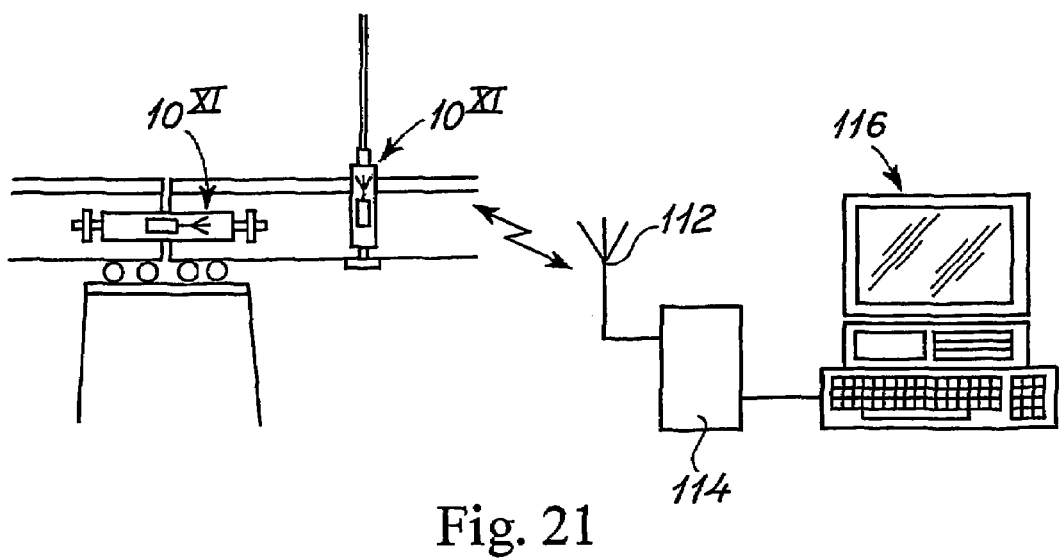
FIG. 21 is a schematic and diagrammatic view illustrating the use of the assembly shown in FIG. 19 as a loadbearing sensor within e.g. a bridge.

In FIG. 21, two different applications of the load detector sensor unit containing assembly $10^{xi}$ is illustrated. In FIG. 21, the one application of the assembly $10^{xi}$ is as a structural element for interconnecting two sections of a bridge and the alternative application comprises the use of the assembly $10^{xi}$ as a load-carrying element for supporting a wire of the carrying structure of the bridge. In FIG. 21, a receiver station for receiving data from the load detector sensor unit 90 is also illustrated comprising a receiver aerial 112 connected to a received stage 114 which deliver on its output an analogue or alternatively a digital signal to a measuring apparatus constituted by a PC designated the reference numeral 116.

Figure 22:
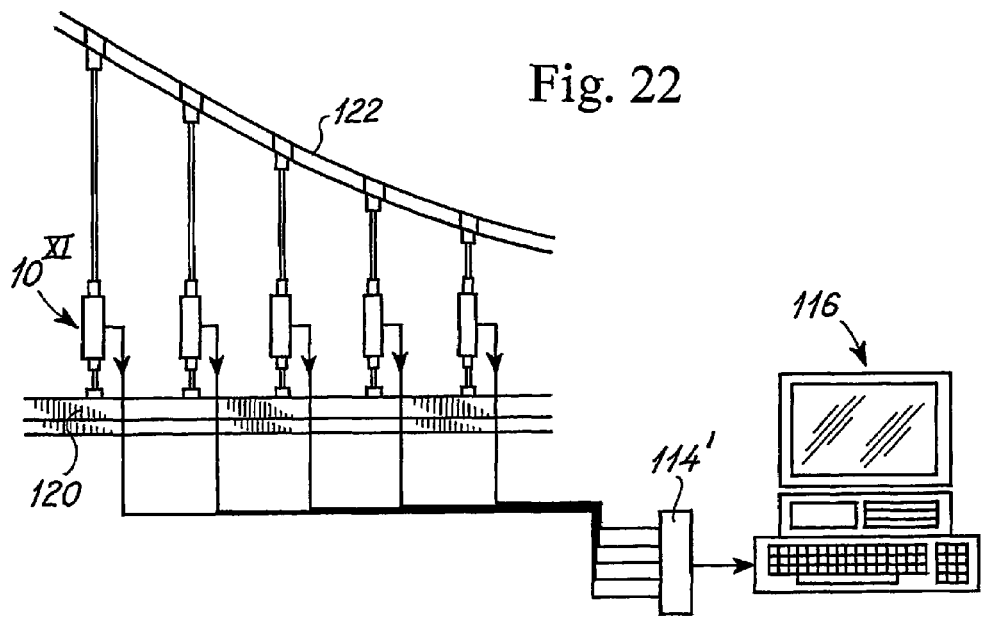
FIG. 22 is a schematic view illustrating a different application of the loadcarrying assembly illustrated in FIG. 19 within a bridge, and including a parallel link to a PC-based measuring station.

In FIG. 22, the usage of a plurality of assemblies $10^{xi}$ is illustrated as in FIG. 22, a total of five assemblies $10^{xi}$ is used for the suspension of a bridge 120 from a wire 122. In FIG. 22, the data-logging is illustrated as a hard wire connection from each of the assemblies $10^{xi}$ to the data logging PC 116 having a total of five parallel inputs, as it is contemplated that the wireless transmission technique illustrated in FIG. 21 may readily be modified into a semi hard wire connection by the use of proximity detection technique by the use of a receiver unit positioned juxtaposed each of the assemblies $10^{xi}$ for receiving the data or the signals output from the load detector sensor unit and at the same time energising the unit 90 by the supply of energising current to the induction loop 100 of each of the units 90 included in the assemblies $10^{xi}$.

Figure 23:
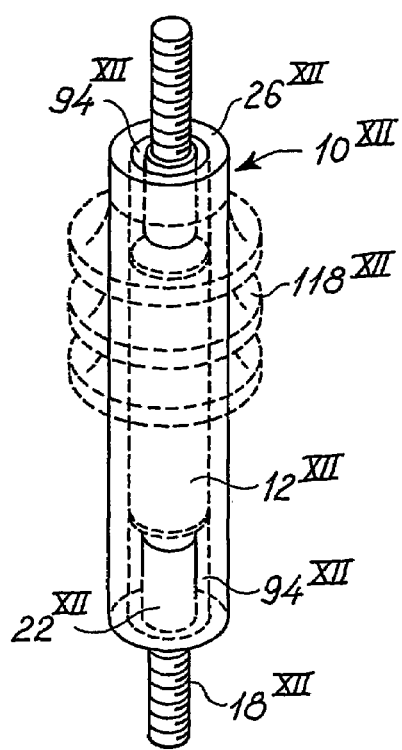
FIG. 23 is a perspective, schematic and partly sectional view of a further embodiment of the assembly according to the present invention configured as an insulator for a high voltage cable.
Figure 24:
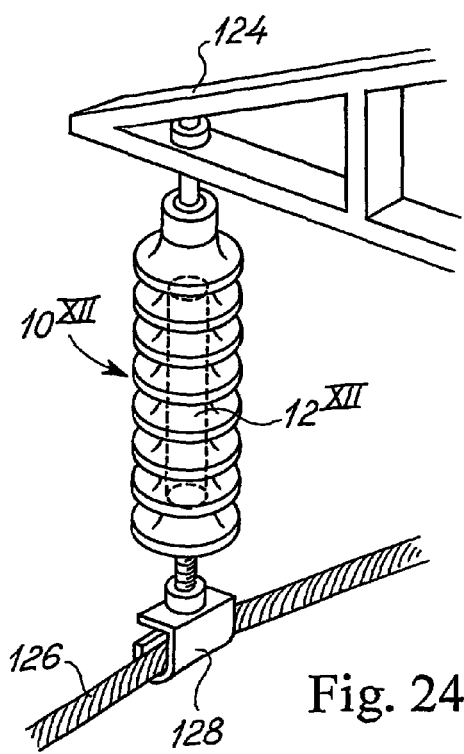
FIG. 24 is a perspective and schematic view illustrating the intentional application of the insulator shown in FIG. 23.

The high load bearing capability of the assembly according to the present invention also allows the technique to be used for alternative applications such as in a high voltage insulator as is illustrated in FIG. 23 and FIG. 24. In FIG. 23, the assembly described above with reference to FIG. 19 is modified by the omission of the load detector sensor unit 90 and by the introduction of a high voltage insulator core body $12^{xii}$ constituted by a sealed hollow encasing in which a highly insulating gas such as $SF_6$ is included. The insulating core body $12^{xii}$ serve the same purpose as the above described core body 12 discussed with reference to FIGS. 1-6. In FIG. 23, the assembly $10^{xii}$ further comprises an outer pulltrusion encasing $26^{xii}$ encasing the insulating core body $12^{xii}$ and further two insulating bushings $94^{xii}$ encircling and encasing the bushings $22^{xii}$ in which the threaded pins $118^{xii}$ are received and fixated. In FIG. 23, three bell-shaped outer insulating elements $118^{xii}$ are further illustrated serving the purpose of preventing water or moisture from generating short-circuiting paths on the outer surface of the pulltrusion encasing $26^{xii}$ as is well known in the art per se.

In FIG. 24, the intentionally application of the high voltage insulator assembly $10^{xii}$ shown in FIG. 23 is illustrated as the high voltage insulating assembly $10^{xii}$ is suspended from a beam 127 for the support of a high voltage wire 126 which is suspended in and supported by a cross shaped fitting 128 which is fixated to the outer end of one of the threaded pins $18^{xii}$ of the assembly $10^{xii}$.

In the present specification, the terms pulltrusion and pulltruding have been used covering the technique of providing and producing the core element and the subassembly. The terms pulltrusion and pulltruding, however, are to be construed broadly covering any combined technique of producing fibre reinforced products including techniques known as pullforming, pullwinding etc. Consequently, it is to be understood that any technique covered by the above terms or equivalent techniques comprising continuous, semi-continuous or intermittent production of elements, such as the core element and the subassembly are to be construed equivalences to the pulltrusion technique described in the present specification.

Although the present invention has above been described with reference to specific, presently preferred embodiments, numerous modifications and amendments are obvious to a person having skill in the art and such modifications or amendments are to be considered part of the present invention without limiting the scope of the invention to the above described embodiments. Rather is the invention to be construed in the terms of the appending claims.

It is to be realised that the protective scope as defined in the appending claims does not cover the geometrical configuration of the assembly 10 shown in FIGS. 1-6 itself, namely the geometrical outer shape of the 'cedar plank' element whereas differently configurated assemblies having specially configured outer surfaces such as the assemblies together constituting the structure shown in FIG. 8 are contemplated to be part of the protective scope as defined in the appending claims.

The invention claimed is:

1. A method of producing a fibre reinforced structural element including a plurality of fixating elements for the fixation of said structural element to another structural element, the method comprising the steps of:
   i) providing a fixating element selected from the group consisting of bolt fixtures, bolts, fittings, and any combination thereof;
   ii) providing an elongated core element of a material compatible with the materials of said fibre reinforced structural element, said core element having an end part with a specific configuration;
   iii) mounting said fixating element on said end part of said core element to produce a subassembly;
   iv) fixating said fixating element relative to said end part of said core element in a pultrusion process selected from the group consisting of (a) pulling said subassembly through a pultruder, circumferentially covering said subassembly with reinforcing fibres and resin, and heating and curing said resin for causing said resin to provide, in conjunction with said reinforcing fibres, a casing circumferentially encircling said subassembly, and (b) encasing said subassembly by adhesion in a casing of fibre-reinforced resin produced in a separate pultrusion process;
   v) machining said subassembly within said casing of said reinforcing fibres and said cured resin to produce a fixating element assembly including said core element and said fixating element;
   vi) repeating said steps i)-v) to produce a plurality of fixating element assemblies;
   vii) positioning said plurality of assemblies according to intended positions of said fixating elements within said fibre reinforced structural element; and
   viii) producing said fibre reinforced structural element including said fixating elements and said plurality of assemblies in a production technique selected from the group consisting of at least one of extrusion, pultrusion, or a fibre reinforcing production technique.

2. The method according to claim 1, wherein said step of providing said elongated core element comprises cutting said elongated core element from a continuous, elongated core element body.

3. The method according to either of claims 1 or 2, wherein said elongated core element has opposite end parts for receiving respective fixating elements at said respective end parts, and further wherein said steps iii) and iv) comprise mounting a fixating element at each of said opposite end parts of said core element, and said step v) comprises machining said subassembly into two halves each comprising a fixating element assembly.

4. The method according to either of claims 1 or 2, wherein said step ii) further comprises machining said end part into a specific configuration to receive and center an end recess part of said fixating element, said end recess part being congruent with said specific configuration of said end part of said core element.

5. The method according to claim 4, wherein said end part and said end recess part are each substantially conical.

6. The method according to either of claims 1 or 2, wherein said casing produced in step iv) has a specific cross-sectional configuration selected from the group consisting of at least one of circular, elliptical, polygonal, hexagonal square, and a combination thereof.

7. The method according to either of claims 1 or 2, wherein said step v) further comprises machining said casing into a specific cross-sectional configuration selected from the group consisting of at least one of circular, elliptical, polygonal, hexagonal, square, and a combination thereof.

8. The method according to either of claims 1 or 2, wherein said step v) further comprises providing an end of said fixation element assembly opposite said fixating element with a tapering cut part.

9. A method of producing a fixating element assembly for use in a fibre reinforced structural element including a plurality of fixating elements for the fixation of said structural element to another structural element, the method comprising the steps of:
   i) providing a fixating element selected from the group consisting of bolt fixtures, bolts, fittings, and any combination thereof;
   ii) providing an elongated core element of a material compatible with the materials of said fibre reinforced structural element, said core element having an end part;
   iii) mounting said fixating element on said end part of said core element to produce a subassembly;
   iv) fixating said fixating element relative to said end part of said core element in a pultrusion process selected from the group consisting of (a) pulling said subassembly through a pultruder, circumferentially covering said subassembly with reinforcing fibres and resin, and heating and curing said resin for causing said resin to provide, in conjunction with said reinforcing fibres, a casing circumferentially encircling said subassembly, and (b) encasing said subassembly by adhesion in a casing of fibre-reinforced resin produced in a separate pultrusion process; and
   v) machining said subassembly within said casing of said reinforcing fibres and said cured resin to produce a fixating element assembly including said core element and said fixating element.

10. The method according to claim 9, wherein said step of providing said elongated core element comprises cutting said elongated core element from a continuous, elongated core element body.

11. The method according to either of claims 9 or 10, wherein said elongated core element has opposite end parts for receiving respective fixating elements at said respective end parts, and further wherein said steps iii) and iv) comprise mounting a fixating element at each of said opposite end parts of said core element, and said step v) comprises machining said subassembly into two halves each comprising a fixating element assembly.

12. The method according to either of claims 9 or 10, wherein said step ii) further comprises machining said end part into a specific configuration to receive and center an end recess part of said fixating element, said end recess part being congruent with said specific configuration of said end part of said core element.

13. The method according to claim 12, wherein said end part and said end recess part are each substantially conical.

14. The method according to either of claims 9 or 10, wherein said casing produced in step iv) has a specific cross-sectional configuration selected from the group consisting of at least one of circular, elliptical, polygonal, hexagonal, square, and a combination thereof.

15. The method according to either of claims 9 or 10, wherein said step v) further comprises machining said casing into a specific cross-sectional configuration selected from the group consisting of at least one of circular, elliptical, polygonal, hexagonal, square, and a combination thereof.

16. The method according to either of claims 9 or 10, wherein said step v) further comprises providing an end of said fixation element assembly opposite said fixating element with a tapering cut part.

* * * * *